Sept. 6, 1966 W. NERGE ETAL 3,270,433
FREEZE-DRYING APPARATUS
Filed July 15, 1963 3 Sheets-Sheet 1

INVENTORS:
Wilhelm Nerge
Ulrich Hackenberg
Horst Ehlers
BY John E. Toupal
ATTORNEY.

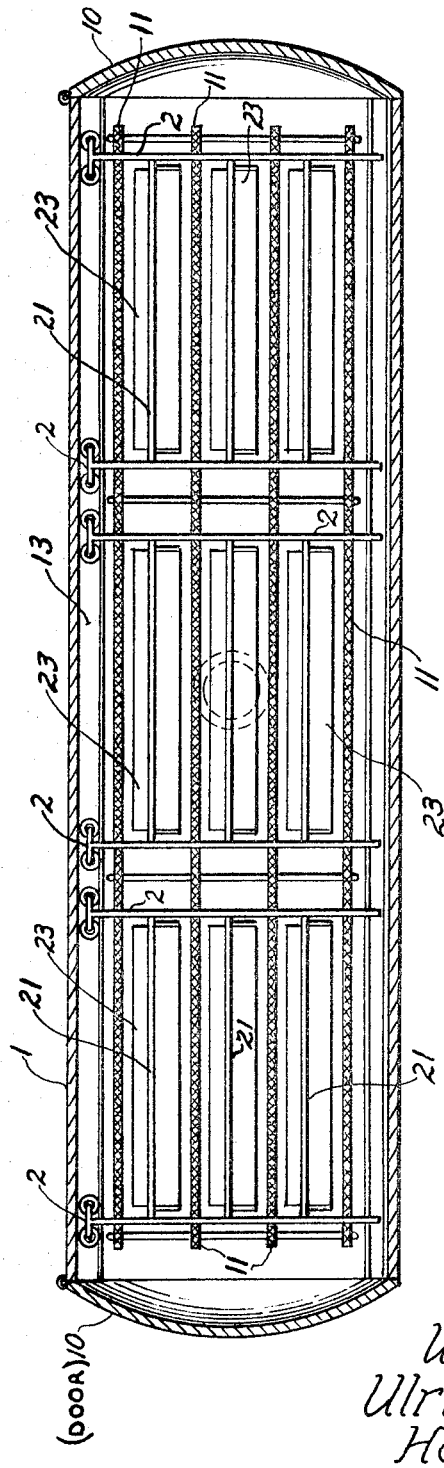

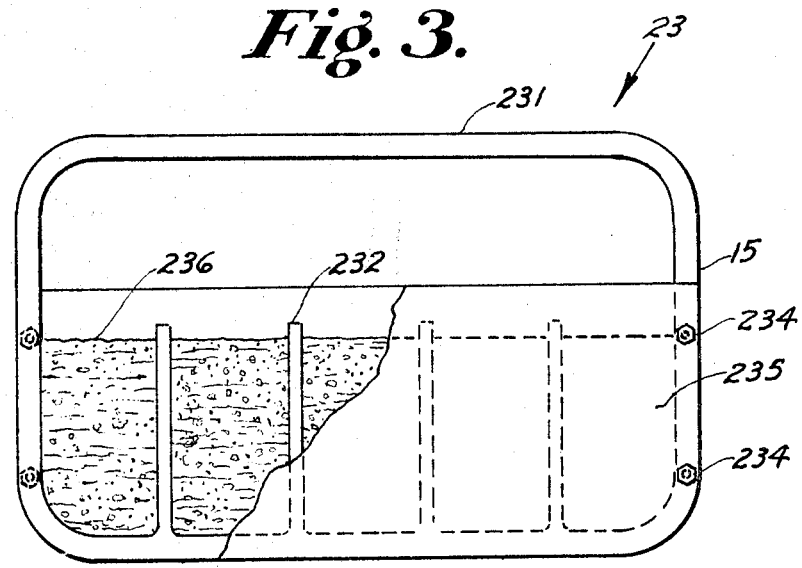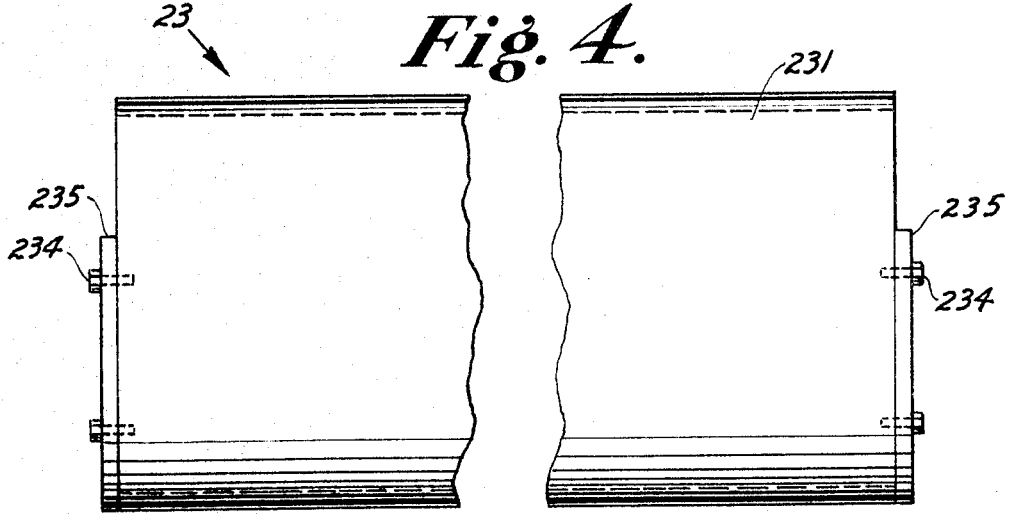

United States Patent Office 3,270,433
Patented Sept. 6, 1966

3,270,433
FREEZE-DRYING APPARATUS
Wilhelm Nerge, Gartenstr. 42, Rodenkirchen, near Cologne, Germany; Ulrich Hackenberg, Alter Trassweg 9, Bensberg, Germany; and Horst Ehlers, 9 Perham St., West Roxbury, Mass.
Filed July 15, 1963, Ser. No. 295,617
Claims priority, application Germany, July 13, 1962, L 42,446
5 Claims. (Cl. 34—92)

This invention relates to vacuum freeze drying and more particularly to improved heat transfer mechanism for use in freeze-drying installations.

Freeze drying is a well-known process in which a material to be dried is first frozen and then placed inside an evacuated chamber. Water vapor removal apparatus, such as, for example, a deep-cooled ice condenser, then absorbs sublimating water vapor produced by heating of the frozen material. A predetermined lower pressure is continuously maintained within the vacuum chamber during the drying process by means of conventional vacuum pumps communicating with the chamber.

A technical problem in the freeze drying of foods resides in the application of sublimation inducing heat to the frozen product. The problem is one of providing the greatest possible food throughput in a given installation. This implies maximum use of the space available within the vacuum chamber and lowest possible drying times. However, in order to avoid heat damage to the drying product, certain limitations as to maximum applied heating temperatures and/or space utilization must be maintained.

One method of freeze drying utilizes heaters to radiantly heat the material being dried. To obtain effective radiant heat transfer, the temperature of the heaters must be substantially greater than that of the product surface. Normally this temperature is greater than that permissible to prevent heat damage of the product (for most products the maximum heat is between 40–80° C.). The drying time must be very short so that the drying surface of the product is not subjected to radiant heat damage. Therefore, only very shallow layers of product material which will dry quickly can be safely used. The loading capacity for systems of this kind is normally limited to about 10 kilograms per square meter.

Another method of applying heat in freeze-drying applications is by conduction or convection from heaters to the frozen product. In this case the material to be dried is maintained as close as possible to the heat source so as to provide the best possible heat transfer therebetween. One embodiment of this method utilizes product containers which are directly heated (for example, by electricity, steam, etc.) so as to function as the heat source. The disadvantages of this embodiment reside in the mechanical difficulties of supplying evenly distributed heat energy to the product containers. The difficulties are accentuated by the fact that the product containers are normally adapted for removal from carrier racks, conveyors, etc., so as to permit ease of product handling.

Another embodiment utilizes product trays adapted to contact stationary heating plates. In this embodiment the difficulty resides in the poor heat transfer through the minute vacuum spaces between the heated plates and the adjacent product containers. The poor heat transfer prevents the attainment of the same temperature in the containers that exists in the heating plates. Thus the plates must be operated above maximum permissible product temperature so as to establish the maximum in the product containers. However, this is also objectionable, since most freeze-drying installations in the interest of efficient space utilization include interleaved layers of product and heat sources. Thus the product in the containers (uncovered to allow escape of water vapor) is subject to the excessive radiant heat of the heater plate positioned directly above the container.

It is, therefore, an object of this invention to provide for more efficient transfer of heat to the drying product in a freeze-drying process without danger of heat damage to the drying product.

One feature of this invention is the provision in a freeze-drying apparatus of sources of both radiant and conduction heating for the product to be dried and wherein the radiant and conduction heat sources are in series.

Another feature of this invention is the provision in a freeze-drying apparatus of the above feature type wherein the radiant heat source is adapted to supply heat energy to the conduction heat source.

Another feature of this invention is the provision in a freeze-drying apparatus of the above feature types wherein the source of conduction heat is adapted to serve as a container for the product to be dried.

Another feature of this invention is the provision in a freeze-drying apparatus of the above feature types wherein the combination food container and conduction heat source is adapted to completely shield the drying product from direct radiation from the radiant heat source.

Another feature of this invention is the provision of a freeze-drying apparatus of the above feature types wherein radiant heat from the radiant heat sources is applied to at least two sides of the combination product container and conduction of heat source.

Another feature of this invention is the provision in a freeze-drying apparatus of the above featured types wherein the portions of the product containers which are subject to direct radiation from the radiant heat source are of unitary construction so as to provide good heat conductivity throughout the container body.

These and other features and advantages of the present invention will become more apparent upon a perusal of the following specification taken in conjunction with the accompanying drawings wherein:

FIGURE 2 is a longitudinal section of the freeze-drying apparatus shown in FIGURE 1;

FIGURE 3 is an enlarged cross-section of one of the product containers shown in FIGURES 1 and 2;

FIGURE 4 is an enlarged end view of the product container shown in FIGURE 3.

Figure 1:
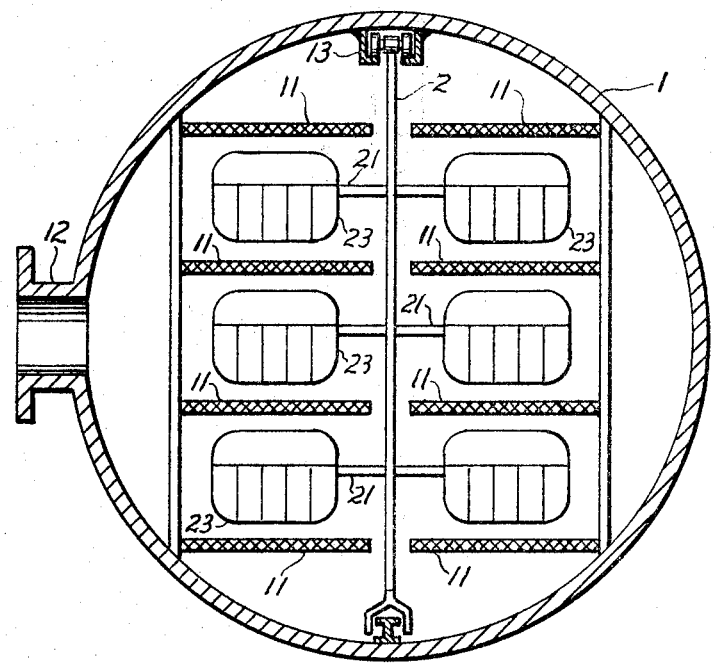
FIGURE 1 is a cross-sectional showing of a freeze-drying apparatus according to this invention.

Referring now to FIGURES 1 and 2 there is shown a cylindrical vacuum freeze-drying chamber 1 enclosing a radiant heater assembly 11. The radiant heater assembly includes a plurality of parallel arranged heating plates 11 supported on opposite sides of the chamber 1. Mounted from the top chamber 1 there is a fixed rail 13 which supports a hanging rack 2. The hanging rack 2 includes a plurality of parallel product container supports 21, which interleave with the parallel radiation heater elements 11. Between the supports 21 removable product containers 23 are hooked and adapted to contain a material to be dried. The rack 2 is adapted for movement along the rail 13 and for removal from the chamber 1 via the demountable end portions 10. A flanged tubulation 12 communicates with the chamber 1 and is adapted for connection to conventional vacuum pumping equipment (not shown).

In FIGURES 3 and 4 there is shown a single container 23 which is constructed of a good heat conducting material. A unitary annular housing 231 having a plurality of inwardly projecting thin walls 232 contains a material 236 to be dried. The open ends of the housing 231 are partially closed by bolt 234, attached end plates 235, which extend from the bottom of the housing to about two-thirds its height.

In operation, the vacuum chamber 1 is evacuated via tubulation 12 and the radiant heaters 11 suitably energized by, for example, electrical current to relatively high temperatures (for example, 150° C.). The resulting heat energy is then radiated through the vacuum space to the top and bottoms of container housings 23. The heat is easily passed by conduction throughout the unitary housings 23 including the projecting walls 232. The housings 23 then transfer heat by both conduction and convection (via the water vapor produced) to the surrounded frozen product 236 so as to cause sublimation therein. The sublimated water vapor coming from the product 236 is removed through the openings in the ends of housings 231 above the end plates 235. Thus the heat is serially conducted from the radiant heat source 11 through the conduction heat sources 23 and into the frozen product 236. Inasmuch as the walls of container 23 are not brought to a temperature higher than that which is permissible for the material to be dried, the radiation from tray wall to the material is harmless to the latter. The top of the housing 23 not being in direct contact with the product 236 easily conducts the received heat thereto via the unitary side wall portions 15 of the housing 23.

The heating elements 11 can advantageously be coated on their upper surfaces with a layer which emits infra-red rays to a large extent. The bottom sides of the heating elements 11 can be left either untreated or coated with a layer of low emissivity. In this way a major portion of the radiant heat will be directed to the bottom portions of the housings 23, which are in direct contact with the product 236. Similarly the tops of housings 23 can be coated for low emissivity and the bottoms for high emissivity.

The temperature of the containers 23 can be measured (by thermal elements, resistance thermometers, contact thermometers, etc., in the tray bottom, for example); and the temperature thus determined can be used to control the temperature of the radiant heaters 11. In this way the temperature of the containers 23 can be maintained to evenly transmit any desired amount of heat to the material 236.

In this way the temperature of the containers 23 can be maintained at a suitable maximum temperature (for example, between 40–80° C.) which is determined according to the characteristics of the material being dried. However, the material to be dried is shielded on all sides by the containers 23 against direct radiation from the radiators 11 operating at above maximum temperature. Also, a sufficiently open cross-section is available above the material for the removal of water vapor from the drying material.

Obviously many modifications and variations of the present invention are possible in the light of the above teachings. It is, therefore, to be understood that within the scope of the appended claims, the invention may be practiced otherwise than as specifically described.

What is claimed is:

1. A freeze drying apparatus comprising an evacuable chamber adapted to receive a material to be freeze dried, a plurality of vertically adjacent radiant heater means positioned within said evacuable chamber, a plurality of heat conducting container devices removably positioned between said radiant heater means within said evacuable chamber, said container devices having base and cover portions in good heat transfer connection and adapted to receive radiant heat from said radiant heater means and to conduct the heat thus received to a material contained by said container devices, said container devices having open portions of substantial size which permit escape of water vapor from a material contained therein, and wherein said container devices comprise solid portions which interrupt all rectilinear paths between said heater means and the interiors of said container devices so as to completely shield the material contained by the container devices from direct radiant heat emanating from said radiant heater means.

2. A freeze-drying apparatus according to claim 1 wherein each of said base and corner portions of said container devices are formed by a solid unitary structure.

3. A freeze-drying apparatus according to claim 2 including demountable end walls which only partially close the ends of said container devices so as to permit escape of water vapor from a material contained therein.

4. A freeze drying apparatus comprising an evacuable chamber adapted to receive a material to be freeze dried, a plurality of vertically adjacent radiant heaters positioned within said evacuable chamber, a plurality of heat conducting container devices removably positioned between said radiant heaters, said container devices having open portions of substantial size which permit escape of water vapor from a material contained therein, and wherein said container devices are solid unitary structures including a base portion facing one of said radiant heaters and a cover portion facing a next adjacent one of said radiant heaters thereby shielding the contents of said containers from direct radiant heat.

5. A freeze-drying apparatus according to claim 4 wherein said container devices are of a hollow cylindrical form, said individual containers are positioned so that their cylindrical walls are substantially parallel to said vertically adjacent radiant heaters, and said hollow cylindrical containers include demountable end wall portions which only partially close said containers so as to permit escape of water vapor formed therewithin.

References Cited by the Examiner

UNITED STATES PATENTS

| | | | |
|---|---|---|---|
| 1,577,709 | 3/1926 | Glessner | 34—92 |
| 2,156,845 | 5/1939 | Gentele | 34—92 |
| 2,292,447 | 8/1942 | Irwin | 34—5 |
| 2,362,117 | 11/1944 | David | 34—92 |
| 2,388,917 | 11/1945 | Hormel | 34—5 |
| 2,602,825 | 7/1952 | Flosdorf. | |
| 2,765,236 | 10/1956 | Blaine | 34—5 |
| 3,096,163 | 7/1963 | Meryman | 34—5 X |

FOREIGN PATENTS

| | | |
|---|---|---|
| 1,102,653 | 3/1961 | Germany. |
| 1,119,773 | 12/1961 | Germany. |

ROBERT A. O'LEARY, *Primary Examiner.*

NORMAN YUDKOFF, *Examiner.*

F. E. DRUMMOND, W. E. WAYNER,
*Assistant Examiners.*